(12) United States Patent
Kim et al.

(10) Patent No.: US 9,826,569 B2
(45) Date of Patent: Nov. 21, 2017

(54) METHOD OF DETECTING INDICATOR INFORMATION IN WIRELESS COMMUNICATION SYSTEM

(71) Applicant: Samsung Electronics Co., Ltd., Gyeonggi-do (KR)

(72) Inventors: Ho-Il Kim, Gyeonggi-do (KR); Da-Hae Chong, Gyeonggi-do (KR); Soo-Bok Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 198 days.

(21) Appl. No.: 14/711,132

(22) Filed: May 13, 2015

(65) Prior Publication Data
US 2015/0334587 A1    Nov. 19, 2015

Related U.S. Application Data

(60) Provisional application No. 61/992,522, filed on May 13, 2014.

(30) Foreign Application Priority Data

Oct. 6, 2014  (KR) .......................... 10-2014-0134549

(51) Int. Cl.
| | |
|---|---|
| *H04W 24/08* | (2009.01) |
| *H04L 12/26* | (2006.01) |
| *H04W 76/04* | (2009.01) |
| *H04L 1/16* | (2006.01) |
| *H04L 1/18* | (2006.01) |

(52) U.S. Cl.
CPC ......... *H04W 76/048* (2013.01); *H04L 1/1607* (2013.01); *H04L 1/1671* (2013.01); *H04L 1/1825* (2013.01); *H04L 1/1838* (2013.01); *H04L 43/0852* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 2007/0116158 A1* | 5/2007 | Guo | ................... | H04L 27/0014 375/343 |
| 2008/0155371 A1* | 6/2008 | Mauritz | ................ | H04L 1/1692 714/748 |
| 2011/0110240 A1* | 5/2011 | Bergquist | .......... | H04W 74/0866 370/241.1 |
| 2013/0288629 A1* | 10/2013 | Balraj | .................. | H04B 17/345 455/226.3 |

* cited by examiner

*Primary Examiner* — Charles C Jiang
*Assistant Examiner* — George Atkins, Jr.
(74) *Attorney, Agent, or Firm* — The Farrell Law Firm, P.C.

(57) ABSTRACT

A method of detecting indicator information received by a receiver of a wireless communication system is provided, and the method includes determining a threshold value that reduces costs incurred by a false alarm rate that decides discontinuous transmission (DTX) information transmitted from a transmitter as non-DTX information and a missed detection rate that decides non-DTX information transmitted from the transmitter as DTX information; and detecting the indicator information using the threshold value. The threshold value is determined based on a reception quality level for acknowledgement (ACK) information when the transmitter transmits the ACK information.

20 Claims, 4 Drawing Sheets

METHOD OF DETECTING INDICATOR INFORMATION IN WIRELESS COMMUNICATION SYSTEM

PRIORITY

This application claims priority under 35 U.S.C. §119(e) to U.S. Provisional Patent Application Ser. No. 61/992,522, which was filed in the U.S. Patent and Trademark Office on May 13, 2014, and under 35 U.S.C. §119(a) to Korean Application Serial No. 10-2014-0134549, which was filed in the Korean Intellectual Property Office on Oct. 6, 2014, the entire contents of which are incorporated herein by reference.

BACKGROUND

1. Field of the Disclosure

The present disclosure generally relates to a method of detecting indicator information transmitted through an indicator channel in a wireless communication system, and more particularly, to a method and apparatus for determining a threshold value, and detecting indicator information based on the determined threshold value.

2. Description of the Related Art

In wireless communication, various types of indicator channels exist. For example, a transmitter (for example, a base station) transmits acquisition indicator through an Acquisition Indicator Channel (AICH) in response to a Random Access (RA) procedure of a receiver (for example, a terminal). The acquisition indicator, which is a response to a random access preamble, may include, for example, Acknowledge (ACK), Negative-Acknowledge (NACK), and No response (NoResponse).

When the receiver receives indicator information from the transmitter, the receiver compares a received value with a threshold value, so as to decide what the indicator information is. That is, the receiver executes detection. The threshold value may be determined based on various criteria.

For example, a Constant False Alarm Rate (CFAR) detector uses a CFAR threshold value for detection, so as to satisfy a predetermined false alarm rate.

As another example, a Constant Missed Detection Rate (CMDR) detector uses a CMDR threshold for detection, so as to satisfy a predetermined missed detection rate (MDR).

As yet another example, a detection method determines a threshold value by taking into consideration both a false alarm rate and a missed detection rate. In this instance, when a threshold value that satisfies both a predetermined false alarm rate and a predetermined missed detection rate does not exist, the method may execute an exceptional process (for example, selecting a threshold value that preferentially satisfies one of a false alarm rate and a missed detection rate).

FIGS. 1A through 3B illustrate methods of determining a threshold value for detecting indicator information using a Probability Density Function (PDF) graph.

FIGS. 1A and 1B illustrate a CFAR detector that satisfies a Constant False Alarm Rate (CFAR), and determination of a threshold value for the CFAR detector.

FIG. 1A illustrates a case in which a PDF graph 100 of a received signal based on a binary hypothesis $H_0$ (with 0 as a tested value) and a PDF graph 110 of a received signal based on a binary hypothesis $H_1$ (with g as a tested value) overlap. A false alarm rate is a probability of determining the indicator information as ACK when the indicator information is Discontinuous Transmission (DTX), and a missed detection rate is a probability of determining the indicator information as DTX when the indicator information is ACK. In this instance, an area indicating the false alarm rate may be expressed by an area 106 enclosed by the horizontal axis 190, the vertical axis indicated by a threshold value $\eta$ 102, and the PDF graph 100 of $H_0$ on the right plane of the vertical axis indicated by the threshold value $\eta$ (: "eta") 102. In addition, an area indicating the missed detection rate may be expressed by an area 104 enclosed by the horizontal axis 190, the vertical axis indicated by the threshold value $\eta$ 102, and the PDF graph 110 of $H_1$ on the left plane of the vertical axis indicated by the threshold value $\eta$ 102.

FIG. 1B illustrates a case in which a PDF graph 120 of a received signal based on $H_0$ and a PDF graph 130 of a received signal based on $H_1$ do not overlap. In this instance, an area indicating the false alarm rate may be expressed by an area 124 enclosed by the horizontal axis 190, the vertical axis indicated by a threshold value 122, and the PDF graph 120 of $H_0$ on the right plane of the vertical axis indicated by the threshold value $\eta$ 122. However, the area enclosed by the horizontal axis 190, the vertical axis indicated by the threshold value $\eta$ 122, and the PDF graph 130 of $H_1$ on the left plane of the vertical axis indicated by the threshold value $\eta$ 122 is actually 0. That is, when the PDF graph 120 of $H_0$ and the PDF graph 130 of $H_1$ do not overlap, the area indicating the missed detection rate may not exist. Thus, when the PDF graph 120, indicating received information when ACK information is transmitted, and the PDF graph 130, indicating received information when DTX information is transmitted, do not overlap and are well separated, although the CFAR detector appears to be capable of determining a CFAR threshold value $\eta$ (to be higher) so as to further decrease a false alarm rate without causing an increase in a missed detection rate, the CFAR detector actually does not adaptively determine a threshold value.

FIGS. 2A and 2B illustrate a CMDR detector that satisfies a Constant Missed Detection Rate (CMDR), and determination of a threshold value $\eta$ for the CMDR detector.

FIG. 2A illustrates a case in which a PDF graph 200 of a received signal based on $H_0$ and a PDF graph 210 of a received signal based on $H_1$ overlap. In this instance, an area indicating a false alarm rate may be expressed by an area 206 enclosed by the horizontal axis 290, the vertical axis indicated by a threshold value $\eta$ 202, and the PDF graph 200 of $H_0$ on the right plane of the vertical axis indicated by the threshold value $\eta$ 202. In addition, an area indicating a missed detection rate may be expressed by an area 204 enclosed by the horizontal axis 290, the vertical axis indicated by the threshold value $\eta$ 202, and the PDF graph 210 of $H_1$ on the left plane of the vertical axis indicated by the threshold value $\eta$ 202.

FIG. 2B illustrates a case in which a PDF graph 220 of a received signal based on $H_0$ and a PDF graph 230 of a received signal based on $H_1$ do not overlap. In addition, an area indicating a missed detection rate may be expressed by an area 224 enclosed by the horizontal axis 290, the vertical axis indicated by a threshold value $\eta$ 222, and the PDF graph 230 of $H_1$ on the left plane of the vertical axis indicated by the threshold value $\eta$ 222. However, an area enclosed by the horizontal axis 290, the vertical axis indicated by the threshold value $\eta$ 202, and the PDF graph 220 of $H_0$ on the right plane of the vertical axis indicated by the threshold value $\eta$ 202 is actually 0. That is, when the PDF graph 220 of $H_0$ and the PDF graph 230 of $H_1$ do not overlap, the area indicating a false alarm rate may not exist. Thus, when the PDF graph 220, indicating received information when ACK information is transmitted, and the PDF graph 230, indicating received information when DTX information is transmitted, do not overlap and are separated, although the CMDR detector is capable of determining a CMDR threshold value (to be lower) so as to further decrease a missed detection rate without causing an increase in the false alarm rate, the CMDR detector actually does not adaptively determine a threshold value.

However, the CMDR detector of FIGS. 2A and 2B may be used for a case in which a quality level of received information, when indicator information is actually transmitted as ACK (Signal to Noise Ratio for ACK ($SNR_{ACK}$)), is estimated through side information from a higher layer or through blind estimation.

FIGS. 3A and 3B illustrate a detector that satisfies both a CFAR and a CMDR, and determination of a threshold value η for the detector.

FIG. 3A illustrates a case in which both a CFAR and a CMDR are satisfied. For example, in FIG. 3A, it is assumed that a threshold value 302 is determined to be a value corresponding to a half of an average value μ (corresponding to a gain of an ACK signal) of a PDF graph 310 of a received signal when $H_1$.

FIG. 3B illustrates a case in which both the area indicating the missed detection rate and the area indicating a false alarm rate do not exist. When determining the threshold value η (=μ/2) 322 of a detector, the detector reduces a simple arithmetic sum of a CFAR and a CMDR (exceptional case) when the CFAR and the CMDR are not simultaneously satisfied. As another example, a threshold value may be determined to satisfy a predetermined one of the CFAR criterion and the CMDR criterion.

A method of merely applying a threshold value that satisfies both a predetermined CFAR and a predetermined CMDR may fail to determine an optimal threshold value. When a threshold value that satisfies both the predetermined CFAR and the predetermined CMDR does not exist, a method of determining a threshold value that satisfies one of the criteria or determining a threshold value of a detector that reduces the sum of a CFAR and a CMDR, may also fail to determine an optimal threshold value. Therefore, there is a desire for an improved method for determining a threshold value of a detector.

The schemes for determining a threshold value of a detector, described through FIGS. 1A through 3B, determine a threshold value to be applied for determining indicator information by taking into consideration a false alarm rate and a missed detection rate, separately or together. The determining schemes simply assume that costs incurred by a false alarm event and costs incurred by a missed detection event are same, and simply take into account minimizing a false alarm rate and a missed detection rate or minimizing the sum of the false alarm rate and the missed detection rate. Thus, optimizing the performance of a detector has not been fulfilled. That is, the detector described in FIGS. 1A through 3B does not take into account actual costs incurred by the false alarm rate and the missed detection rate. For example, for a case of an AICH of Wideband Code Division Multiple Access (WCDMA), costs for a call setup delay may be significantly different between the false error event and the missed detection event.

Unlike traffic information of a data channel which is to reduce a symbol error probability, for indicator information of an indicator channel, determination of a threshold value needs to take into consideration costs since a large amount of cost may be incurred by a false alarm event or a missed detection event.

SUMMARY

The present disclosure has been made to solve the above-mentioned problem and/or disadvantages and to provide at least advantages described below. Accordingly, an aspect of the present disclosure provides a method of determining a threshold value that reduces overall costs by reflecting, to cost function modeling, actual costs which are different for each of a false alarm rate and a missed detection rate, and provides a method and apparatus for detection using the same.

Another aspect of the present disclosure provides a method of determining a threshold value by taking into consideration actual costs incurred by the false alarm rate and the missed detection rate.

In accordance with an aspect of the present disclosure, a method of detecting indicator information received by a receiver of a wireless communication system is provided. The method includes determining a threshold value that reduces costs incurred by a false alarm rate that decides discontinuous transmission (DTX) information transmitted from a transmitter as non-DTX information and a missed detection rate that decides non-DTX information transmitted from the transmitter as DTX information; and detecting the indicator information using the threshold value. The threshold value is determined based on a reception quality level for Acknowledgement (ACK) information when the transmitter transmits the ACK information.

In accordance with another aspect of the present disclosure, a receiving apparatus that detects received indicator information in a wireless communication system, the receiving apparatus includes a controller configured to determine a threshold value that reduces costs incurred by a false alarm rate that decides Discontinuous Transmission (DTX) information transmitted from a transmitter as non-DTX information and a missed detection rate that decides non-DTX information transmitted from the transmitter as DTX information; and a detector configured to detect indicator information using the threshold value The threshold value is determined based on a reception quality level for Acknowledge (ACK) information when the transmitter transmits the ACK information.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION

Figure 1A:
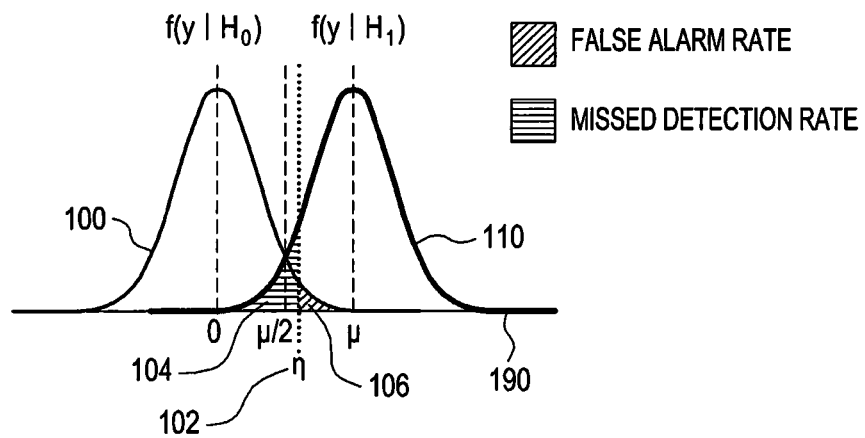
FIGS. 1A and 1B are diagrams illustrating a Constant False Alarm Rate (CFAR) detector that satisfies a CFAR, and determination of a threshold value for the CFAR detector.
Figure 1B:
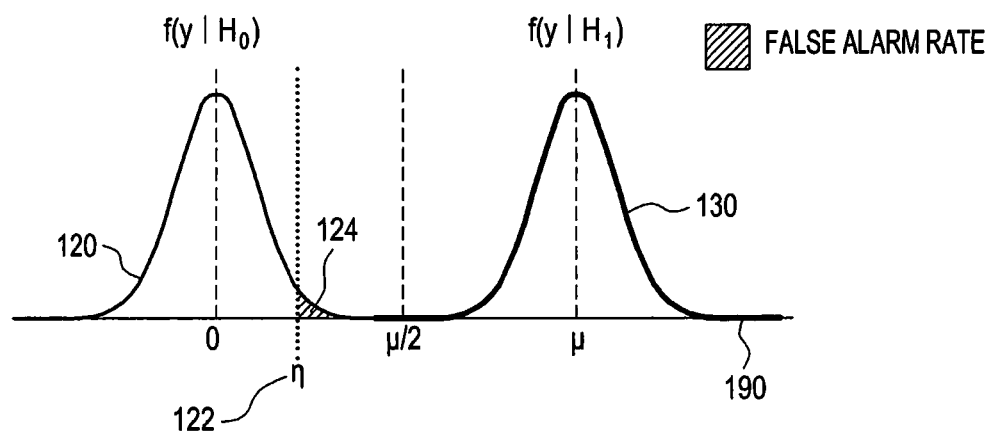
Figure 2A:
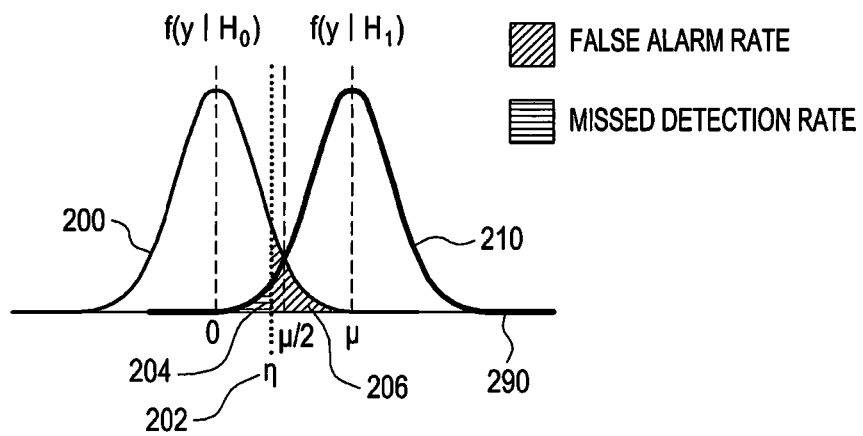
FIGS. 2A and 2B are diagrams illustrating a Constant Missed Detection Rate (CMDR) detector that satisfies a CMDR, and determination of a threshold value for the CMDR detector.
Figure 2B:
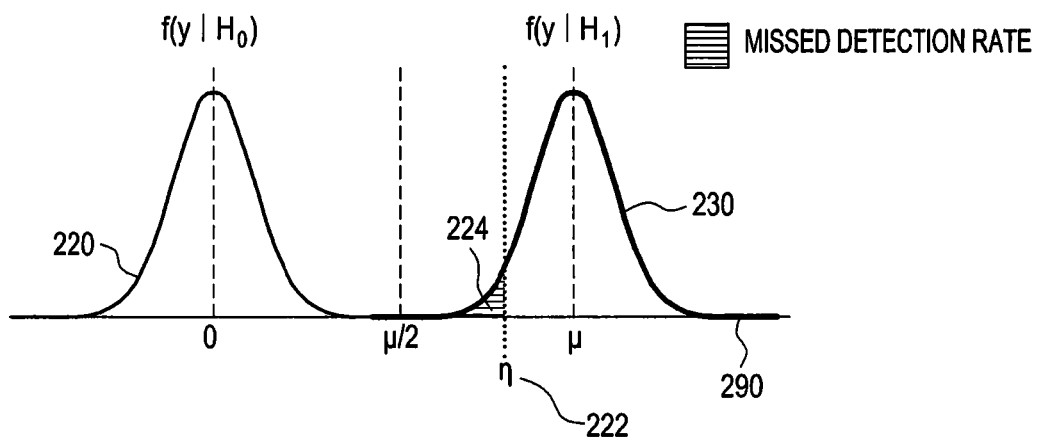

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. Terms described below are defined in consideration of the functions of the present disclosure, but may vary according to the intention or convention of a user or operator. Therefore, the definitions of the terms should be determined based on the contents throughout the specification.

In the detailed description of the present disclosure, an example of interpretable meanings of some terms used in the present disclosure is proposed. However, it is noted that the terms are not limited to the examples of the construable meanings which are proposed below.

In the present disclosure, a transmitter may be a base station in a wireless communication system. A base station is a main body communicating with a User Equipment (UE), and may be referred to as a Base Station (BS), a Node B (NB), an eNode B (eNB), an Access Point (AP), or the like.

In the present disclosure, a receiver may be a user's equipment in a wireless communication system. The user's equipment is a subject communicating with the BS, and may be referred to as a UE, a Mobile Station (MS), a Mobile Equipment (ME), a device, a terminal, and the like.

In the present disclosure, a detector refers to a module that is included in a receiver for determining a value of received information based on a threshold value. The detector may be referred to as a detecting unit, so as to express that it is a component module of the receiver.

For ease of description, the present disclosure assumes that indicator information transmitted by a transmitter is binary information, that is, non-DTX (for example, ACK) information and DTX information. However, the present disclosure may be applied to, for example, a case in which transmitted indicator information is non-binary (for example, ACK, NACK, and DTX) information, such as a 3$^{rd}$ Generation Partnership Project (3GPP), Enhanced-Dedicated Channel (E-DCH), and Acknowledgement Indicator Channel (E-HICH). In addition, the method provided in the present disclosure may be described through a method of detecting indicator information (ACK/NACK/DTX) of an AICH of 3GPP WCDMA. The method of the present disclosure may be applied to all wireless communication receivers that may use a detection method that compares a received value with a threshold value so as to determine what received information is, in addition to the 3GPP WCDMA AICH. Therefore, the method may be applied to all the receivers that compare indicator information of an indicator channel with a threshold value, for detection. For example, the detection method of the present disclosure may be applied to receivers of a Paging Indicator Channel (PICH) of a WCDMA system, a Multimedia Broadcast & Multicast Service (MBMS) Indicator Channel (MICH), an E-HICH, and an E-DCH Relative Grant Channel (E-RGCH), and may be applied to a receiver of a Secondary Synchronization Channel (S-SCH) that receives Space Time Transmit Diversity (STTD) encoding information. In addition, the detection method of the present disclosure may be applied to a detection method of a receiver that receives ACK/NACK information of an uplink High-Speed Dedicated Physical Control Channel (HS-DPCCH) of a High Speed Downlink Packet Access (HSDPA) system, and may be applied to a receiver of a Physical Hybrid ARQ Indicator Channel (PHICH) of a Long Term Evolution (LTE) system.

Figure 4:
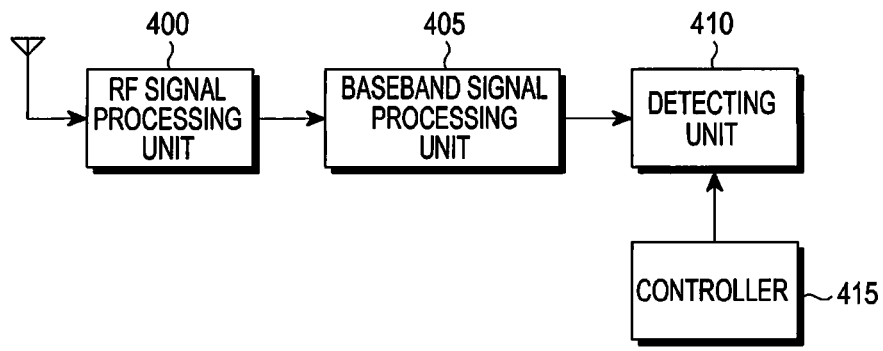
FIG. 4 is a diagram illustrating a configuration of a wireless communication receiving apparatus that detects indicator information according to an embodiment of the present disclosure.

FIG. 4 is a diagram illustrating a configuration of a wireless communication receiving apparatus that detects indicator information according to an embodiment of the present disclosure.

The receiver according to an embodiment of the present disclosure includes at least one of a Radio Frequency (RF) signal processing unit 400, a baseband signal processing unit 405, a detecting unit 410, and a controller 415.

The RF signal processing unit 400 receives an electric wave and converts the electric wave into a digital signal.

The baseband signal processing unit 405 removes a channel effect from a received digital signal using a predetermined signal processing algorithm, so as to obtain an indicator signal. In addition, the baseband signal processing unit 405 measures a reception quality level $SNR_y$ of indicator information from the indicator signal, and transfers the measured reception quality level $SNR_y$ to the detecting unit 410. The baseband signal processing unit 405 may be embodied as, for example, a module such as a rake receiver.

The detecting unit 410 determines and then detects indicator information using an indicator signal from which an effect of a channel is removed. In particular, the detecting unit 410 compares a received indicator signal y and a threshold value η, or compares a reception quality level SNR with a reception quality level threshold value $SNR_{th}$, so as to determine and then detects the indicator information.

The controller 415 determines a reception quality level threshold value (η or $SNR_{th}$) that reduces overall costs using an expected value associated with costs incurred by a false alarm event and an expected value associated with costs incurred by a missed detection event, and transfers the threshold value to the detecting unit 410 that determines and then detects indicator information.

For ease of description, although FIG. 4 illustrates the RF signal processing unit 400, the baseband signal processing unit 405, the detecting unit 410, and the controller 415 included in the receiver of the present disclosure as separate component parts, the component parts may be embodied as a single module integrated with the controller 415. Alternatively, it may be construed that all of the operations for the detection method described in the present disclosure are implemented by the controller 415. Before describing a method of determining a reception quality level threshold value $SNR_{th}$, provided in the present disclosure, a system model of a received signal will be described.

It is assumed that a received signal y associated with indicator information is modeled as Equation (1).

$$y = a \cdot \mu + w \quad \text{Equation (1)}$$

Here, a denotes indicator information, μ denotes a gain term, and w denotes Additive White Gaussian Noise (AWGN) having an average value 0 and a noise power $\sigma^2$. a may be classified as Equation (2).

$$H_2: a=+1(ACK)$$

$$H_1: a=-1(NACK)$$

$$H_0: a=0(DTX) \quad \text{Equation (2)}$$

$H_n$ denotes a hypothesis. When $H_0$ is assumed, a=0, and this indicates that indicator information is DTX. DTX is indicator information that is processed as 0 in a receiver when a transmitter does not transmit indicator information. When $H_1$ is assumed, a=−1, and this indicates that indicator information is NACK. When $H_2$ is assumed, a=+1, and this indicates that indicator information is ACK.

For ease of description, binary types of indicator information (that is, On-Off Keying) are used as shown in Equation (3). However, the example of the present disclosure does not limit to a case of detecting non-binary indicator information. For example, the detection method of the present disclosure may be used for detecting ternary indicator information (that is, ACK/NACK/DTX).

$$H_1: a=+1(ACK)$$

$$H_0: a=0(DTX) \quad \text{Equation (3)}$$

That is, hereinafter, a case in which indicator information is DTX and ACK will be described. When $H_0$ is assumed, a=0, and this indicates that indicator information is DTX. When $H_1$ is assumed, a=+1, and this indicates that indicator information is ACK.

w of Equation (1) may be modeled as Equation (4).

$$w \in N(0,\sigma^2) \quad \text{Equation (4)}$$

N is a noise function that has an average 0 and a noise power $\sigma^2$, as factors. Here, it is assumed that the receiver that receives indicator information is aware of the noise power $\sigma^2$ through estimation.

When the transmitter transmits ACK as indicator information, the receiver may define a reception quality level SNR $SNR_{ACK}$ of the indicator information by Equation (5).

$$SNR_{ACK} = \frac{\mu^2}{\sigma^2} \quad \text{Equation (5)}$$

The receiver is aware of power $\sigma^2$ of an ACK signal, which is a numerator term of the reception quality level information, through directly receiving the same from a higher layer or through indirectly estimating the same from a progression of information that is transmitted in advance and is determined to be non-DTX. For example, in a 3GPP Frequency Division Duplex (FDD) system, the receiver may indirectly calculate the power of an ACK signal from an estimated SNR value of a Primary Common Pilot Channel (P-CPICH) using an AICH power offset indicating a gain term $\mu^2$. Alternatively, for an indicator channel (for example, a 3GPP E-HICH) that may not be aware of a power offset in comparison with the P-CPICH, the receiver estimates a power offset of an E-HICH in comparison with the P-CPICH, and uses the same to calculate a power value of an ACK signal of the E-HICH.

It is assumed that the received signal y has the following PDF f for each hypothesis (that is, $H_1$ and $H_0$), as shown in Equations (6) and (7), respectively.

$$f(y|H_1) = \frac{1}{\sqrt{2\pi\sigma^2}} \exp\left(-\frac{(y-\mu)^2}{2\sigma^2}\right) \quad \text{Equation (6)}$$

$$f(y|H_{10}) = \frac{1}{\sqrt{2\pi\sigma^2}} \exp\left(-\frac{y^2}{2\sigma^2}\right) \quad \text{Equation (7)}$$

For example, a method for a CFAR detector, which may be applied to the Neyman-Pearson detector, will be described.

To maximize a detection rate $P_D$ under a constraint condition of satisfying a target false alarm rate ($P_{FA}$), the likelihood ratio test of Equation (8) or the log-likelihood ratio test of Equation (9) may be executed.

$$L(y) \triangleq \frac{f(y|H_1)}{f(y|H_0)} > \gamma \quad \text{Equation (8)}$$

$$\ln L(y) \triangleq \ln \frac{f(y|H_1)}{f(y|H_0)} > \ln\gamma \quad \text{Equation (9)}$$

Here, $\triangleq$ denotes equivalence by definition, and $\gamma$ (: "gamma") denotes a threshold value used for the likelihood ratio test. That is, the likelihood ratio test compares a ratio of a probability distribution when the indicator information is 1 to a probability distribution when the indicator information is 0, with the threshold value $\gamma$.

A probability that the receiver determines a transmitted ACK ($H_1$) as an ACK ($\hat{H}=H_1$), that is, a detection rate $P_D$, is defined as Equation (10).

$$P_D = P(\hat{H}=H_1|H_1) = \int_{\{y|L(y)>\gamma\}} f(y|H_1)dy \quad \text{Equation (10)}$$

Here, P denotes a probability function.

A probability that the receiver determines a transmitted DTX ($H_0$) as ACK ($\hat{H}=H_1$), that is, a false alarm rate $P_{FA}$, is defined as Equation (11), and the threshold value $\gamma$ of the likelihood ratio test is determined from the definition of $P_{FA}$ as shown in Equation (11).

$$P_{FA} = P(\hat{H}=H_1|H_0) = \int_{\{y|L(y)>\gamma\}} f(y|H_0)dy \quad \text{Equation (11)}$$

The log-likelihood ratio test of Equation (9) may be modified based on Equation (6) and Equation (7), as shown in Equation (12).

$$\ln\frac{f(y|H_1)}{f(y|H_0)} = -\frac{(y-\mu)^2}{2\sigma^2} + \frac{y^2}{2\sigma^2} = \frac{\mu \cdot y}{\sigma^2} - \frac{\mu^2}{2\sigma^2} > \ln\gamma \quad \text{Equation (12)}$$

Here, by defining a threshold value $\eta$ as shown in Equation (13), a received signal observation value y may be used as test statistics.

$$y > \left(\ln\gamma + \frac{\mu^2}{2\sigma^2}\right)\frac{\sigma^2}{\mu} \triangleq \eta \quad \text{Equation (13)}$$

The receiver compares the received signal observation value y with the threshold value $\eta$, and thus, calculates the false alarm rate $P_{FA}$, as shown in Equation (14).

$$P_{FA} = P(y>\eta|H_0) = \int_\eta^\infty f(y|H_0)dy = Q\left(\frac{\eta}{\sigma}\right) = \frac{1-\text{erf}\left(\sqrt{\frac{\eta^2}{2\sigma^2}}\right)}{2} \quad \text{Equation (14)}$$

The receiver compares the received signal observation value y with the threshold value $\eta$, and thus, calculates the detection rate $P_D$, as shown in Equation (15).

$$P_D = P(y>\eta|H_1) = \int_{y>\eta}^\infty f(y|H_1)dy = \quad \text{Equation (15)}$$

-continued $$Q\left(\frac{\eta-\mu}{\sigma}\right) = \frac{1 - \mathrm{erf}\left(\sqrt{\frac{\eta^2}{2\sigma^2}} - \sqrt{\frac{\mu^2}{2\sigma^2}}\right)}{2}$$

Through modification of Equation (14) and Equation (15) based on Equation (5), the detection rate $P_D$ and the false alarm rate $P_{FA}$ may have a relationship as shown in Equation (16) or Equation (17).

$$P_D = Q(Q^{-1}(P_{FA}) - \sqrt{SNR_{ACK}}) \qquad \text{Equation (16)}$$

$$P_D = \frac{1 - \mathrm{erf}\left(\mathrm{erf}^{-1}(1 - 2P_{FA}) - \sqrt{\frac{SNR_{ACK}}{2}}\right)}{2} \qquad \text{Equation (17)}$$

Here, Q function and erf function (that is, error function) are defined as Equation (18) and Equation (19), respectively.

$$Q(z) = \frac{1}{\sqrt{2\pi}} \int_z^\infty \exp\left(-\frac{y^2}{2}\right) dy \qquad \text{Equation (18)}$$

$$\mathrm{erf}(z) = \frac{2}{\sqrt{\pi}} \int_0^z \exp(-y^2) dy \qquad \text{Equation (19)}$$

Subsequently, a method of determining a reception quality level threshold value ($\eta$ or $SNR_{th}$) in the above described system model of a received signal, according to an embodiment of the present disclosure, will be described.

When $Q^{-1}$ function (that is, an inverse function of Q function) and $\mathrm{erf}^{-1}$ function (that is, an inverse function of erf function) are applied to a result of Equation (14), the threshold value $\eta$ is specified using $P_{FA}$ as shown in Equation (20) or Equation (21).

$$\eta = \sigma \cdot Q^{-1}(P_{FA}) \qquad \text{Equation (20)}$$

$$\eta = \sqrt{2}\sigma \cdot \mathrm{erf}^{-1}(1 - 2P_{FA}) \qquad \text{Equation (21)}$$

A reception quality level of a received indicator signal is $SNR_y = y^2/\sigma^2$, and a threshold value of a reception quality level used for determining indicator information is $SNR_{th} = \eta^2/\sigma^2$. Therefore, an operation of comparing the signal observation value y and a threshold value $\eta$ may be regarded to be actually identical to an operation of comparing $y^2/\sigma^2$ and $\eta^2/\sigma^2$. Therefore, the operation of comparing y and $\eta$ may be regarded to be identical to an operation of comparing SNR and $SNR_{th}$.

Hereinafter, the threshold value $\eta$ of the detector described in FIGS. 1A through 3B will be described with Equations (16) and (17).

As described above, the CFAR detector of FIG. 1B determines $P_{FA}$ that satisfies a threshold value $\eta$ which attains a target value. However, the CFAR detector of FIG. 1B does not use $SNR_{ACK}$ information, and thus, loses a chance of improvement in performance that would decrease a false alarm rate $P_{FA}$ without causing a decrease in a detection rate $P_D$. That is, the CFAR detector of FIG. 1B does not take into account, at all, a case in which two probability distributions of a received signal y for the binary hypothesis do not overlap and are separated.

As described above, the CMDR detector of FIG. 2B performs a detection method for attaining a target detection rate (or a desired detection rate), and determines a threshold value $\eta$ that satisfies the target detection rate using $SNR_{ACK}$ information. The CMDR detector of FIG. 2B uses $SNR_{ACK}$ information, but takes into account only the target detection rate $P_D$, and thus, loses a chance of improvement in performance that would increase a detection rate $P_D$ without causing an increase in a false alarm rate $P_{FA}$. That is, the CMDR detector of FIG. 2B does not take into account, at all, a case in which two probability distributions of a received signal y for the binary hypothesis do not overlap and are separated.

Figure 3A:
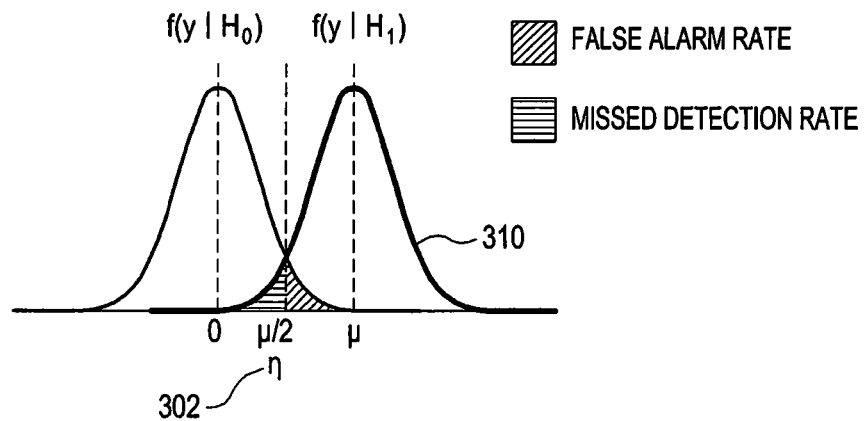
FIGS. 3A and 3B are diagrams illustrating a detector that satisfies both of a CFAR and a CMDR, and determination of a threshold value for the detector.
Figure 3B:
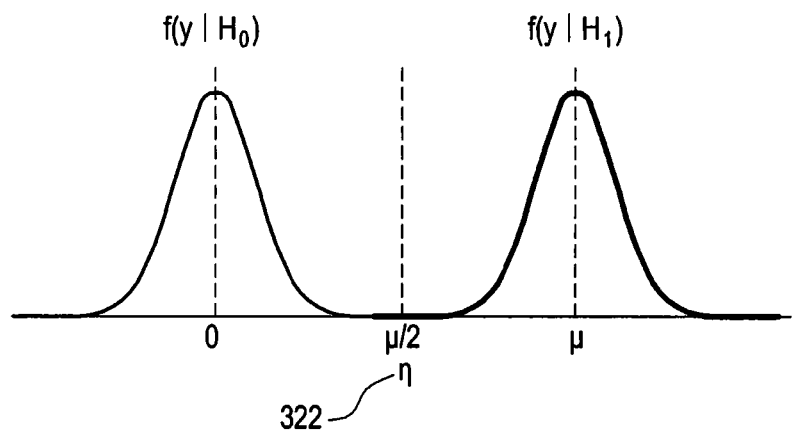

As described above, when a threshold value $\eta$ that simultaneously satisfies a target detection rate $P_D$ and the target false alarm rate $P_{FA}$ exists, the detector of FIG. 3A may use the threshold value $\eta$. When the threshold value $\eta$ does not exist, the detector may select one of the performance indices, which is a preferred based on various policies, from the false alarm rate and the target detection rate, or may reduce a simple sum (that is, a weight of 1:1) of the false alarm rate and the target detection rate. However, the detector does not take into account overall costs of a receiver system that uses the detector.

That is, the detectors of FIGS. 1A through 3B may satisfy one or both of a target false alarm rate and a target detection rate, and merely takes into consideration a simple sum of them, but fails to take into account the costs of the overall system.

In the present disclosure, the receiver manages indicator information differently from managing a symbol error rate of other information (for example, traffic information through a general data channel), and thus, may take into account costs incurred by false determination on the indicator information when the detector determines an optimal threshold value $\eta$. That is, the present disclosure provides a detection method and a detection apparatus that determines an optimal threshold value by taking into consideration costs incurred by false determination. Alternatively, the receiver of the present disclosure may determine a reception quality level threshold value $SNR_{th} = \eta^2/\sigma^2$ which is equivalent to a threshold value $\eta$.

An embodiment of the present disclosure illustrates a method of determining an optimal threshold value by regarding a call setup delay that a user experiences as costs, when a receiver of a WCDMA FDD system detects an AICH. A method described hereinafter is merely an example, and the present disclosure may be applied to all types of wireless communication systems that may estimate $SNR_{ACK}$ when an ACK is actually received, using information from a higher layer, or may indirectly estimate $SNR_{ACK}$ from previous progression information associated with indicator information that is received in advance and is determined to be ACK information.

A cost function C that is based on the call setup delay that the user of the receiver experiences may be modeled as Equation (22).

$$C = \sum_x \sum_y C_{xy} P(\hat{H} = H_y | H_x) P(H_x) \qquad \text{Equation (22)}$$

Here, $C_{xy}$ denotes costs incurred when a hypothesis $H_x$ is determined to be a hypothesis $H_y$.

When the call setup delay is applied as costs, Equation (22) may be expressed as Equation (23).

$$C = T_{00} P(\hat{H}=H_0|H_0)P(H_0) + T_{01}P(\hat{H}=H_1|H_0)P(H_0) + \\ T_{10}P(\hat{H}=H_0|H_1)P(H_1) + T_{11}P(\hat{H}=H_1|H_1)P(H_1) \qquad \text{Equation (23)}$$

Here, $T_{xy}$ denotes temporal costs incurred when a hypothesis $H_x$ is determined to be a hypothesis $H_y$ (Here, X is 0 or 1, and Y is 0 or 1). In an embodiment of the present disclosure, a time is regarded as costs, and thus, $C_{xy}$ is expressed by $T_{xy}$.

$T_{00}$ denotes a call setup delay when DTX is determined as DTX, that is, a case of "correct rejection". In an embodiment of the present disclosure, it is assumed that $T_{00}$ is equal to $T_{10}$.

$T_{01}$ is a call setup delay when DTX is determined as non-DTX (for example, an ACK), that is, when "false alarm" occurs, and may be regarded as, for example, 1 second.

$T_{10}$ is a call setup delay when non-DTX (for example, an ACK) is determined as DTX, that is, when "missed detection" occurs, and may have various values based on a condition given to the receiver according to the WCDMA FDD standards, and may be regarded as, for example, 16 millisecond (ms).

$T_{11}$ denotes a call setup delay when non-DTX (for example, an ACK) is determined to be non-DTX (for example, an ACK), that is, when "detection" occurs. By assuming that there is no call setup delay when "correct rejection" occurs, $T_{11}$ may be regarded as 0 ms.

Here, it is assumed that costs of $T_{01}$ are not equivalent to the costs of $T_{10}$, and have a value several times of that of $T_{10}$.

A sum of a missed detection rate $P_M$ that the receiver determines a transmitted ACK ($H_1$) as DTX ($\hat{H}=H_0$) and a detection rate $P_D$ that the receiver determines the transmitted ACK as an ACK ($\hat{H}=H_1$) is 1, and thus, the missed detection rate $P_M$ is $1-P_D$. In addition, a sum of a correct rejection rate that the receiver determines a transmitted DTX ($H_0$) as DTX ($\hat{H}=H_0$) and a false alarm rate $P_{FA}$ that the receiver determines the transmitted DTX as an ACK ($\hat{H}=H_1$) is 1, and thus, the correct rejection rate $P(\hat{H}=H_0|H_0)$ is $1-P_{FA}$. When the costs C of Equation (23) is simplified through mathematical manipulation, it is expressed as Equation (24).

$$C = T_{10}[1 - P(\hat{H} = H_1 | H_0)]P(H_0) +$$
$$T_{01}P(\hat{H} = H_1 | H_0)P(H_0) + T_{10}P(\hat{H} = H_1 | H_0)P(H_1) =$$
$$T_{10}[1 - P_{FA}]P(H_0) + T_{01}P_{FA}P(H_0) + T_{10}P_M P(H_1) =$$
$$T_{10}P(H_0) + (T_{01} - T_{10})P_{FA}P(H_0) + T_{10}P_M P(H_1) =$$
$$T_{10}P(H_0) + (T_{01} - T_{10})\frac{1 - \mathrm{erf}\left(\sqrt{\frac{\eta^2}{2\sigma^2}}\right)}{2}P(H_0) +$$
$$T_{10}\frac{1 + \mathrm{erf}\left(\sqrt{\frac{\eta^2}{2\sigma^2}} - \sqrt{\frac{SNR_{ACK}}{2}}\right)}{2}P(H_1)$$

Equation (24)

In addition, for the mathematical formality of the induction of Equation (24), the following as shown in Equation (25) is assumed.

$$P_M \triangleq P(\hat{H}=H_0|H_1)=1-P_D$$
$$P_D \triangleq P(\hat{H}=H_1|H_1)$$

Equation (25)

It is assumed that the cost function C of Equation (24) always has a minimum value for $\eta^2/\sigma^2$. Therefore, an optimal threshold value $\eta$ (or a threshold value $SNR_{th}=\eta^2/\sigma^2$ for $SNR_y=y^2/\sigma^2$) may be determined by calculating a solution of a partial differential equation of Equation (26) for the cost function C of Equation (24).

$$\frac{\partial C}{\partial SNR_{th}} = 0$$

Equation (26)

By calculating a solution of a differential equation of Equation (26) through the mathematical manipulation, the optimal threshold value $SNR_{th}$ (that is, $SNR_{th\_MinCost}$) may be determined as Equation (27).

$$SNR_{th\_MinCost} = 2\left(\frac{\ln\frac{(T_{01} - T_{10})P(H_0)}{T_{10} \cdot P(H_1)} + \frac{SNR_{ACK}}{2}}{2\sqrt{\frac{SNR_{ACK}}{2}}}\right)^2$$

Equation (27)

Conditions of Equation (28) and Equation (29) are assumed for the induction of Equation (27).

$$(T_{01}-T_{10})P(H_0)>0$$

Equation (28)

$$\ln\frac{(T_{01} - T_{10})P(H_0)}{T_{10} \cdot P(H_1)} + \frac{SNR_{Al}}{2} > 0$$

Equation (29)

Since statistics advance information (a-priori probability) associated with a binary hypothesis is absent, $H_0$ and $H_1$ are assumed as, for example, an Equi-probable event and it is regarded that $P(H_0)=P(H_1)=\frac{1}{2}$, and thus, Equation (29) associated with an optimal threshold value $SNR_{th}$ may be further simplified as shown in Equation (30).

$$SNR_{th\_MinCost} = 2\left(\frac{\ln\frac{(T_{01} - T_{10})}{T_{10}} + \frac{SNR_{ACK}}{2}}{2\sqrt{\frac{SNR_{ACK}}{2}}}\right)^2$$

Equation (30)

As shown in Equation (30), the threshold value $SNR_{th}$ that reduces costs according to an embodiment of the present disclosure includes a reception quality level SNRACK of a received indicator signal when ACK is actually received, as a factor. In addition, the minimum cost threshold value includes a consideration of the costs $T_{01}$ and $T_{10}$ that the receiver (or a user) pays for in association with a false alarm rate and a missed detection rate. Therefore, the detector according to an embodiment of the present disclosure may have better performance than a conventional detector. Detailed descriptions about numerical improvement in costs, which is a performance index, will be omitted below.

Figure 5:
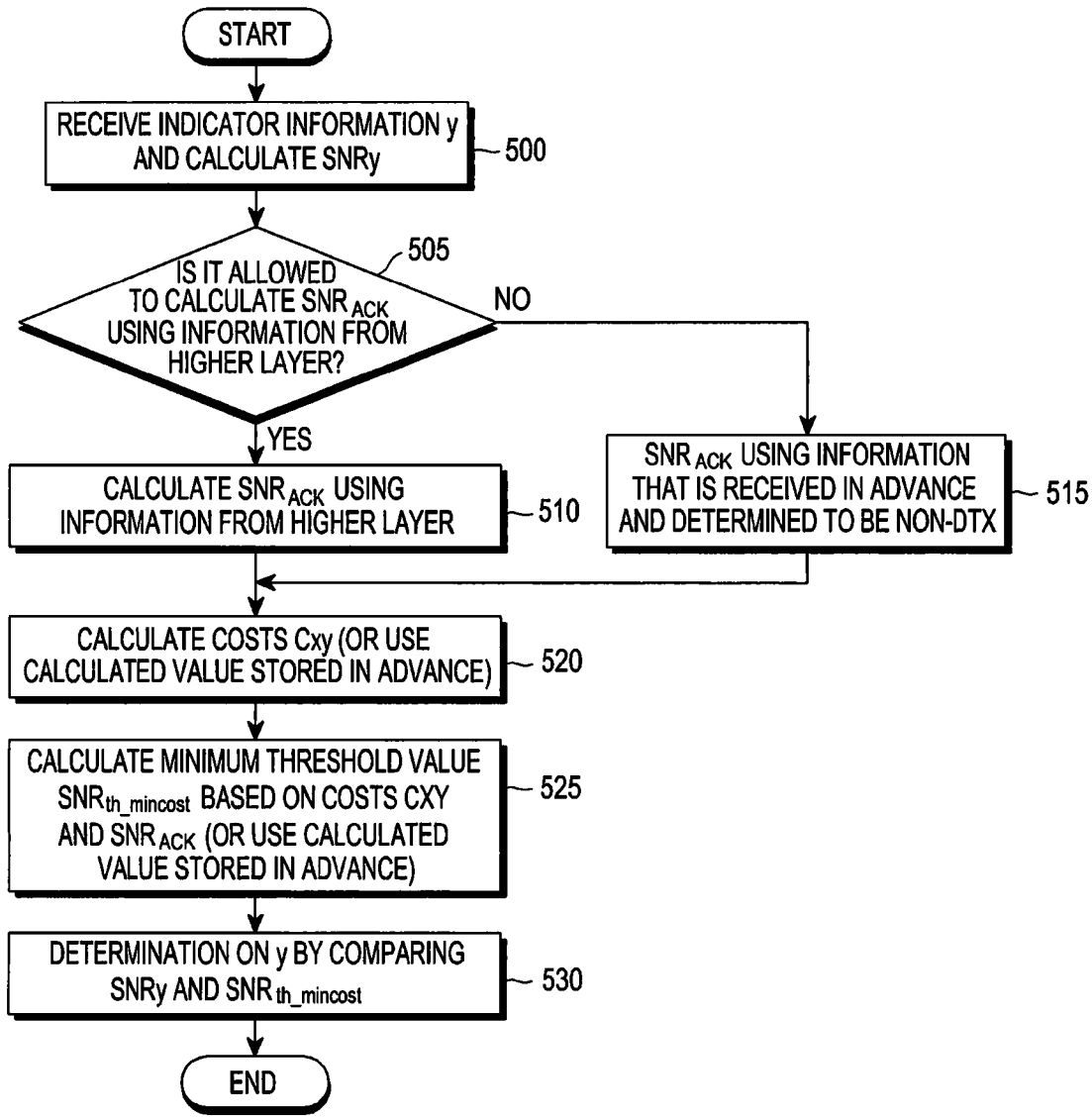
FIG. 5 is a diagram illustrating a detection method using a reception quality level threshold value for detection, according to an embodiment of the present disclosure.

FIG. 5 is a diagram illustrating a detection method using a reception quality level threshold value for detection, according to an embodiment of the present disclosure.

It should be construed that a receiver according to an embodiment of the present disclosure may implement a detection method of the present disclosure by executing only part of the operations illustrated in FIG. 5. That is, it is not necessary that the method of the present disclosure is implemented only when all of the procedures illustrated in FIG. 5 are executed.

The receiver receives and processes an RF signal, so as to receive an indicator signal from the RF signal. The receiver calculates a reception quality level SNR from a received indicator signal every time when the receiver receives an indicator signal through an indicator channel, in step 500.

The receiver may calculate the reception quality level $SNR_{ACK}$ expected when ACK information is actually received, based on information from a higher layer, or may indirectly estimate the same from a progression of received indicator information which is received in advance and is determined to be non-DTX when there is no assistance from the higher layer. In particular, the receiver checks whether it is allowed to calculate $SNR_{ACK}$ using information from a higher layer, in step 505.

When it is allowed, as a result of the check executed in step 505, the receiver calculates $SNR_{ACK}$ based on the information from the higher layer, in step 510. When it is not allowed, as a result of the check 505 executed in step 505, the receiver indirectly estimates $SNR_{ACK}$ using the progression of received indicator information that is received in advance and is determined to be non-DTX in step 515.

The receiver may calculate costs $C_{xy}$ when it is required, in step 520. Alternatively, the receiver may store and use a value calculated as costs $C_{xy}$. For example, the costs $C_{xy}$ may be a time in which the receiver (or a user) endures, and may be expressed by $T_{xy}$.

The receiver calculates a threshold value ($SNR_{th}$ or η) that reduces overall costs based on $C_{xy}$ and $SNR_{ACK}$, in step 525. The threshold value $SNR_{th}$ may be determined based on, for example, Equation 30. Alternatively, the receiver may not calculate a threshold value for each time, but store previously calculated threshold values (for example, in a look-up table, or the like) and determine the stored threshold value as a threshold value to be used by the detecting unit of the receiver.

The receiver compares the reception quality level of the received indicator information with the determined threshold value ($SNR_{th}$ or η), so as to execute determination (that is, detection) on whether the indicator information is DTX or ACK, in step 530.

It has been described that the present disclosure compares a threshold value $SNR_{th}$ associated with a reception quality level with a quality level $SNR_y$ of a received signal. However, the method of the present disclosure may be applied to a detector that compares received information y and a threshold value η.

It should be construed that the diagram of the receiving apparatus of FIG. 4 and the diagram illustrating the detection method of FIG. 5 do not intend to limit the scope of the present disclosure. That is, it should not be construed that all component parts or operations shown in FIGS. 4 and 5 are essential component elements for implementing the present disclosure, and it should be understood that a few component elements may implement the present disclosure within a scope without departing the subject matter of the present disclosure.

The above described operations may be implemented by providing a memory device storing corresponding program codes to a receiver in a communication system or to a certain constituent unit in a user equipment. That is, the controller of the smart module or device may perform the above described operations by reading and executing the program codes stored in the memory device by means of a processor or a central processing unit (CPU).

The various components of the smart module, device, and the like, used in the specification may operate by using a hardware circuit, for example, a combination of a complementary metal oxide semiconductor based logical circuit, firmware, software and/or hardware, and a combination of firmware and/or software inserted into a machine-readable medium. For example, various electric configurations and methods may be carried out by using electric circuits such as transistors, logic gates, and an application specific integrated circuit (ASIC).

The present disclosure may use a threshold value for detection, which decreases a false alarm rate without causing an increase in a missed detection rate.

In addition, the present disclosure may use a threshold value for detection, which decreases a missed detection rate without causing an increase in a false alarm rate.

A detector of the present disclosure applies a threshold value that reduces costs that a receiver pays for and the receiver (or a terminal) of the present disclosure may reduce costs such as call setup delay, and thus, the service quality that a user experiences may be improved.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. A method of detecting indicator information received by a receiver of a wireless communication system, the method comprising:
    determining a threshold value that reduces costs incurred by a false alarm rate that determines discontinuous transmission (DTX) information transmitted from a transmitter as non-DTX information and a missed detection rate that determines non-DTX information transmitted from the transmitter as DTX information; and
    detecting the indicator information using the threshold value,
    wherein the threshold value is determined based on a reception quality level for acknowledgement (ACK) information when the transmitter transmits the ACK information, and
    wherein the threshold value is determined based on a signal power of the received indicator information, an inverse function of an error function, and the false alarm rate.

2. The method of claim 1, wherein the threshold value is a threshold value η for received indicator information y, and is determined based on $$\eta = \sqrt{2}\sigma \cdot erf^{-1}(1-2P_{FA}),$$

wherein σ denotes a signal power of the received indicator information, erf−1 denotes an inverse function of an error function, and PFA denotes false a alarm rate.

3. The method of claim 1, wherein the costs include a call setup delay incurred by the false alarm rate and the missed detection rate.

4. The method of claim 1, wherein the threshold value is a threshold value SNRth for a SNRy which is a signal to noise ratio of the received indicator information y.

5. The method of claim 4, further comprising:
    calculating the signal to noise ratio SNRy,
    wherein detecting the indicator information using the threshold value comprises determining the indicator information by comparing the signal to noise ratio SNRy with the threshold value SNRth.

6. The method of claim 5, wherein the threshold value SNRth is determined based on one of:

$$SNR_{th\_MinCost} = 2\left(\frac{\ln\frac{(T_{01} - T_{10})P(H_0)}{T_{10} \cdot P(H_1)} + \frac{SNR_{ACK}}{2}}{2\sqrt{\frac{SNR_{ACK}}{2}}}\right)^2$$

and $$SNR_{th\_MinCost} = 2\left(\frac{\ln\frac{(T_{01} - T_{10})}{T_{10}} + \frac{SNR_{ACK}}{2}}{2\sqrt{\frac{SNR_{ACK}}{2}}}\right)^2,$$

wherein T01 denotes a call setup delay incurred when a false alarm occurs, T10 denotes a call setup delay incurred when missed detection occurs, P(H0) denotes a probability that assumes indicator information is DTX information, P(H1) denotes a probability that assumes indicator information is non-DTX information, and SNRACK denotes a reception quality level for ACK information.

7. The method of claim 1, wherein determining the threshold value that reduces the costs incurred by the false alarm rate and missed detection rate comprises one of:
calculating a threshold value that reduces the costs to be the threshold value; and
selecting at least one threshold value from a table storing threshold values for reducing the costs to be the threshold value.

8. The method of claim 1, wherein the reception quality level is SNRACK and is calculated using information received from a higher layer or is calculated from a progression of indicator information that is received in advance and is determined to be non-DTX information.

9. The method of claim 4, wherein the signal to noise ratio SNRy is defined as $y2/\sigma 2$ or $y2$.

10. The method of claim 1, wherein the indicator information is binary information, and the non-DTX information includes ACK information, or wherein the indicator information is non-binary information, and the non-DTX information includes ACK information and Negative-Acknowledge (NACK) information.

11. An apparatus that detects indicator information in a wireless communication system, the apparatus comprising:
a controller configured to determine a threshold value that reduces costs incurred by a false alarm rate that determines discontinuous transmission (DTX) information transmitted from a transmitter as non-DTX information and a missed detection rate that determines non-DTX information transmitted from the transmitter as DTX information; and
a detector configured to detect indicator information using the threshold value,
wherein the threshold value is determined based on a reception quality level for acknowledge (ACK) information when the transmitter transmits the ACK information, and
wherein the threshold value is determined based on a signal power of the received indicator information, an inverse function of an error function, and the false alarm rate.

12. The apparatus of claim 11, wherein the threshold value is a threshold value η for received indicator information y, and is determined based on $$\eta = \sqrt{2}\sigma \cdot erf^{-1}(1-2P_{FA}),$$

wherein σ denotes a signal power of the received indicator information, erf−1 denotes an inverse function of an error function, and PFA denotes a false alarm rate.

13. The apparatus of claim 11, wherein the costs include a call setup delay incurred by the false alarm rate and the missed detection rate.

14. The apparatus of claim 11, wherein the threshold value is a threshold value SNRth for a SNRy which is a signal to noise ratio of the received indicator information y.

15. The apparatus of claim 14, further comprising:
a baseband signal processing unit configured to calculate the signal to noise ratio SNRy,
wherein the detector is further configured to determine the indicator information by comparing the signal to noise ratio SNRy with the threshold value SNRth.

16. The apparatus of claim 15, wherein the controller is further configured to determine the threshold value SNRth that reduces the costs, based on one of:

$$SNR_{th\_MinCost} = 2\left(\frac{\ln\frac{(T_{01} - T_{10})P(H_0)}{T_{10} \cdot P(H_1)} + \frac{SNR_{ACK}}{2}}{2\sqrt{\frac{SNR_{ACK}}{2}}}\right)^2$$

and $$SNR_{th\_MinCost} = 2\left(\frac{\ln\frac{(T_{01} - T_{10})}{T_{10}} + \frac{SNR_{ACK}}{2}}{2\sqrt{\frac{SNR_{ACK}}{2}}}\right)^2,$$

wherein T01 denotes a call setup delay incurred when a false alarm occurs, T10 denotes a call setup delay incurred when missed detection occurs, P(H0) denotes a probability that assumes indicator information is DTX information, P(H1) denotes a probability that assumes indicator information is non-DTX information, and SNRACK denotes a reception quality level for ACK information.

17. The apparatus of claim 11, wherein the controller is further configured to determine the threshold value by executing one of calculating a threshold value that reduces the costs to be the threshold value and selecting at least one threshold value from a table storing threshold values for reducing the costs to be the threshold value.

18. The apparatus of claim 11, wherein the baseband signal processing unit is further configured to calculate a reception quality level SNRACK using information received from a higher layer or from a progression of indicator information that is received in advance and is determined to be non-DTX information.

19. The apparatus of claim 14, wherein the signal to noise ratio SNRy is defined as $y2/\sigma 2$ or $y2$.

20. The apparatus of claim 11, wherein the indicator information is binary information, and the non-DTX information includes ACK information, or wherein the indicator information is non-binary information, and the non-DTX information includes ACK information and Negative-Acknowledge (NACK) information.

* * * * *